US009927243B2

(12) United States Patent
Demortier et al.

(10) Patent No.: US 9,927,243 B2
(45) Date of Patent: Mar. 27, 2018

(54) METHOD AND SYSTEM FOR ADJUSTING THE DESCENT TRAJECTORY OF AN AIRCRAFT

(71) Applicant: Airbus Operations (SAS), Toulouse (FR)

(72) Inventors: Jean-Pierre Demortier, Maurens (FR); Valentin Vincent, Toulouse (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 302 days.

(21) Appl. No.: 14/690,695

(22) Filed: Apr. 20, 2015

(65) Prior Publication Data

US 2015/0308834 A1    Oct. 29, 2015

(30) Foreign Application Priority Data

Apr. 28, 2014    (FR) ..................................... 14 53799

(51) Int. Cl.
| | | |
|---|---|---|
| *G06F 19/00* | (2011.01) | |
| *G06G 7/70* | (2006.01) | |
| *G01C 21/20* | (2006.01) | |
| *G05D 1/06* | (2006.01) | |
| *G05D 1/00* | (2006.01) | |
| *G05D 1/08* | (2006.01) | |
| *G05D 3/00* | (2006.01) | |
| *G06F 7/00* | (2006.01) | |
| *G06F 17/00* | (2006.01) | |

(52) U.S. Cl.
CPC ........... *G01C 21/20* (2013.01); *G05D 1/0676* (2013.01)

(58) Field of Classification Search
CPC ......... G01C 21/20; G05D 1/0676; G05D 1/00

USPC ........................................................ 701/18, 7
See application file for complete search history.

(56) References Cited

U.S. PATENT DOCUMENTS

| | | | |
|---|---|---|---|
| 2003/0210168 A1* | 11/2003 | Ruszkowski, Jr. | .. H04N 19/507 342/25 R |
| 2006/0085101 A1 | 4/2006 | Berard | |
| 2010/0274419 A1 | 10/2010 | Lacombe et al. | |

(Continued)

FOREIGN PATENT DOCUMENTS

| | | |
|---|---|---|
| EP | 1600733 | 11/2005 |
| FR | 2944887 | 10/2010 |

OTHER PUBLICATIONS

French Search Report, dated Jan. 27, 2015.
"Continuous Descent Approaches with Variable Flight-Path Angles under Time Constraints", Richard Sopjes et al., Aug. 8, 2011.

*Primary Examiner* — Mahmoud S Ismail
(74) *Attorney, Agent, or Firm* — Greer, Burns & Crain, Ltd.

(57) ABSTRACT

A system comprising an adjustment unit installed in an aircraft and configured to adjust a descent trajectory and associated prediction calculations as a function of an adjustment parameter. The system comprises information processing units for automatically calculating, on the ground and from recorded flight data, an effective value of a calculation parameter, and a corresponding theoretical value of the calculation parameter, with the help of an auxiliary performance database which is identical to a performance database installed in the aircraft, for identical flight conditions, and for deriving therefrom the adjustment parameter that will be used subsequently by the adjustment unit.

9 Claims, 1 Drawing Sheet

(56) References Cited

U.S. PATENT DOCUMENTS

2013/0030611 A1\* 1/2013 Constans .............. G08G 5/025
 701/7
2013/0080043 A1 3/2013 Ballin et al.

\* cited by examiner

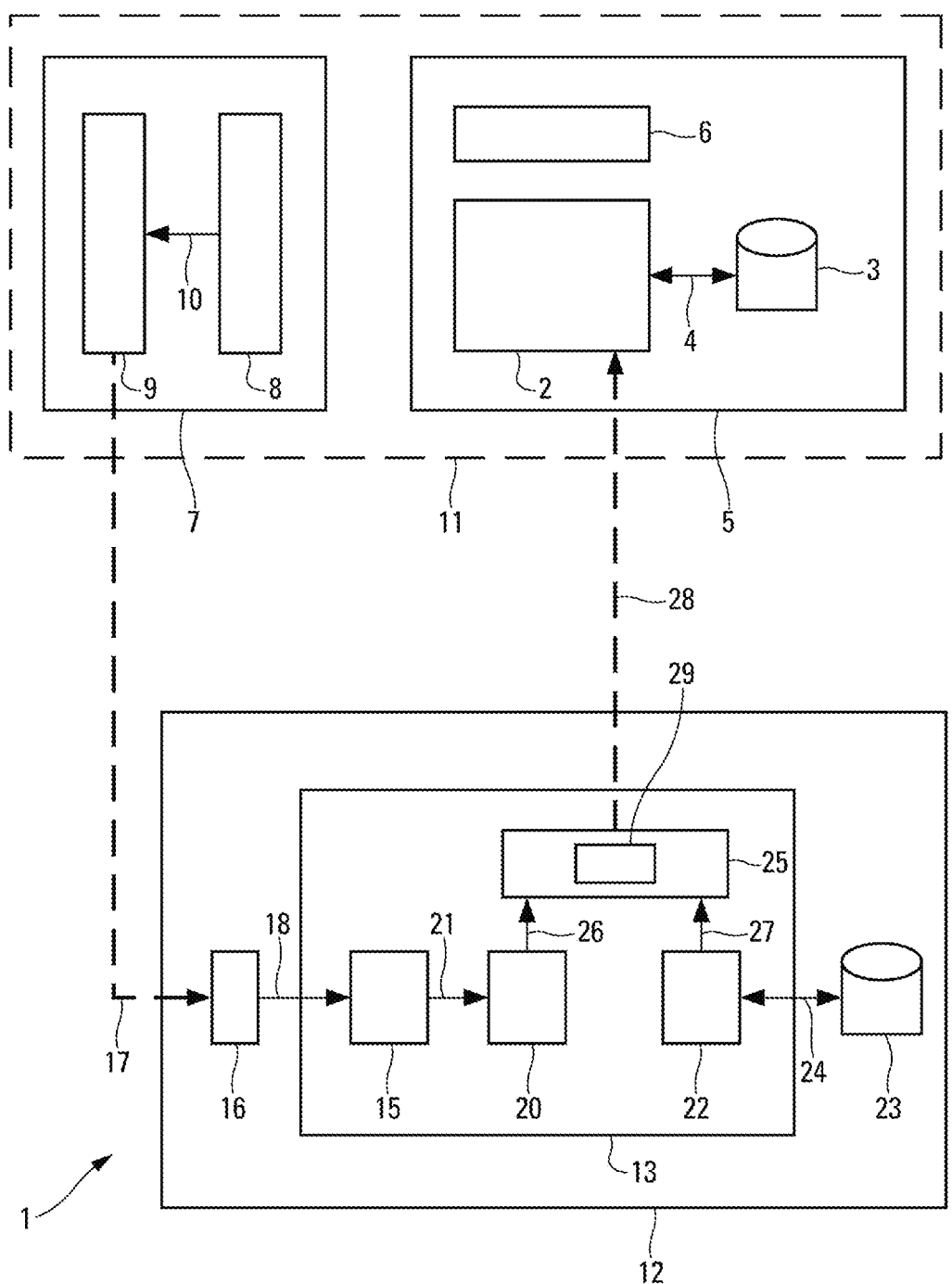

METHOD AND SYSTEM FOR ADJUSTING THE DESCENT TRAJECTORY OF AN AIRCRAFT

CROSS-REFERENCES TO RELATED APPLICATIONS

This application claims the benefit of the French patent application No. 1453799 filed on Apr. 28, 2014, the entire disclosures of which are incorporated herein by way of reference.

BACKGROUND OF THE INVENTION

The present invention relates to a method and a system for adjusting the descent trajectory of an aircraft, in particular of a transport aircraft.

It is known that modern aircraft have onboard systems which make it possible, with the help of performance data described below, to calculate a flight plan, as well as associated predictions, and to guide the aircraft so that it follows the calculated flight plan.

On certain aircraft, the performance data are not reset by flight tests for the descent phases during which the engines of the aircraft are operating in idling mode and can therefore exhibit differences with respect to the real performance of the aircraft when it is delivered. Moreover, these differences can increase with the degradation of the aerodynamics or the wear of the engines during the service life of the aircraft.

In this context, means must be developed in order to model the descent performance of the aircraft as accurately as possible. As the performance data are notably used during a descent for determining the position of the start of descent point, a low quality model can give rise to a descent that is to early or too late, which can hamper the pilot's operation, give rise to thrust increases or to deployment of air brakes during the descent and to an overall excess fuel consumption.

New generation flight management systems, of the FMS (Flight Management System) type, generally comprise a functionality that allows the adjustment of the descent profiles and the predictions associated with these profiles, using for this purpose a value called an adjustment parameter. This functionality is able to vary the performance of the aircraft on both the descent and approach profiles.

However, this adjustment parameter depends on the type of the engines but not on the real capabilities of the aircraft.

SUMMARY OF THE INVENTION

The purpose of the present invention is to overcome this disadvantage. The invention relates to a method for adjusting the descent trajectory of an aircraft which makes it possible to obtain a particularly accurate adjustment parameter.

For this purpose, according to the invention, the adjustment method comprises an adjustment step comprising adjusting the descent trajectory and associated prediction calculations as a function of an adjustment parameter by the intermediary of at least one performance function using at least one performance database installed in the aircraft, the adjustment parameter representing a deviation of values of a control parameter of at least one engine of the aircraft, the method furthermore comprising a series of steps, prior to the adjustment step, and comprising, automatically:

a) determining and recording on at least one aircraft, during at least one flight of the aircraft, values of flight parameters of the aircraft called flight data;

b) extracting from said recorded flight data, data relating to stabilized conditions with the engines of the aircraft idling, representing measurement points, and of determining, for each of said measurement points, an effective value of a calculation parameter and associated flight conditions;

c) calculating, for the measurement points, theoretical values of the calculation parameter using an auxiliary performance database which is identical to the performance database installed in the aircraft, for conditions identical to the flight conditions; and d) calculating, for the measurement points, the differences between the effective values and the theoretical values of said calculation parameter, and deriving therefrom a calculation parameter difference (by calculating the average of these differences), and of determining, from this calculation parameter difference, the adjustment parameter which is then used for adjusting the descent trajectory and the associated prediction calculations.

Thus, thanks to the invention, the adjustment parameter is calculated from effective (or real) values obtained from recorded fight data and calculated theoretical values for identical conditions. Consequently, the adjustment is carried out using an adjustment parameter which is adapted to the real conditions existing on the aircraft (via the recording and the processing of flight data), which makes it possible to obtain an accurate adjustment parameter and thus also an accurate adjustment of the descent trajectory and of the associated prediction calculations.

In the context of the present invention:
"performance functions" refers to a set of performance calculations and to performance data, which give a direct service to the pilot and/or to the aircraft and notably to the flight management system of the aircraft;
"performance data" refers to tables of data representing parameters of the aircraft (aerodynamic, engines, . . . ) which are used for a calculation of the flight mechanics, called performance, the performance data being stored in at least one performance database installed in the aircraft; and
"performance calculation" refers to a calculation of the flight mechanics illustrating the behavior of the aircraft and using performance data.

The engine control parameter, can correspond to any parameter of an engine making it possible to adjust and control that engine. Advantageously, the control parameter is the speed of the low pressure body of an engine of the aircraft.

The present invention can be implemented for various calculation parameters.

In a first embodiment, the calculation parameter corresponds directly to the control parameter of the engine of the aircraft, and step d) comprises calculating a control parameter difference, the adjustment parameter corresponding to this control parameter difference.

Moreover, in a second embodiment, the calculation parameter represents the thrust of at least one engine of the aircraft, and step d) comprises calculating a thrust difference and in converting this thrust difference into a control parameter difference, the adjustment parameter corresponding to this control parameter difference.

Moreover, in a third embodiment, the control parameter represents the position of a start of descent point, and step d) comprises:

calculating a start of descent point position difference between an effective value and a theoretical value;

determining a theoretical descent profile from this start of decent point position difference; and determining a control parameter difference from this theoretical descent profile, the adjustment parameter corresponding to this control parameter difference.

Moreover, in a particular embodiment, the sequence of steps a) to d) is implemented for a plurality of flights in order to calculate a plurality of adjustment parameters, that is to say one adjustment parameter for each flight, and the method comprises an additional step comprising calculating the average of the plurality of adjustment parameters in order to obtain an optimized adjustment parameter, the optimized adjustment parameter being used for adjusting the descent trajectory during the adjustment step. Moreover, in a particular variant, the sequence of steps a) to d) is implemented for flights carried out by different aircraft.

The present invention also relates to a system for adjusting the descent trajectory of an aircraft.

According to the invention, this system comprises an adjustment unit installed in the aircraft and configured to automatically adjust the descent trajectory and associated prediction calculations as a function of an adjustment parameter by the intermediary of at least one performance function, the performance function using at least one performance database, also installed in the aircraft, the adjustment parameter representing a deviation of values of a control parameter of at least one engine of the aircraft, the system furthermore comprising:

a set of measuring units installed in the aircraft and configured for automatically determining, during at least one flight of the aircraft, values of flight parameters of the aircraft, called flight data;

a first information processing unit configured to automatically extract from the recorded flight data, data relating to stabilized conditions with the engines of the aircraft idling, representing measurement points;

a second information processing unit configured to determine, for each of the measurement points, an effective value of a calculation parameter and associated flight conditions;

a third information processing unit configured to automatically calculate, for the measurement points, a theoretical value of the calculation parameter, with the help of an auxiliary performance database which is identical to the performance database installed in the aircraft, for conditions identical to the flight conditions; and a fourth information processing unit configured to automatically calculate, for the measurement points, the differences between the effective values and the theoretical values of the calculation parameter, and to derive therefrom a calculation parameter difference (by calculating the average of these differences), and to determine the adjustment parameter from this calculation parameter difference, the adjustment parameter being transmitted to the adjustment unit and being used by the adjustment unit for adjusting the descent trajectory and the associated prediction calculations.

Moreover, advantageously:

the system comprises a flight management system which is installed in the aircraft and which comprises the adjustment unit and the performance database; and/or the first, second, third and fourth information processing units, as well as the auxiliary performance database, form part of an adjustment parameter determining device, preferably located on the ground and notably available to maintenance operators.

BRIEF DESCRIPTION OF THE DRAWINGS

The appended FIGURE will give a good understanding of how the invention can be embodied.

This single FIGURE is a block diagram of a particular embodiment of an adjustment system, making it possible to illustrate the invention.

DETAILED DESCRIPTION OF THE PREFERRED EMBODIMENTS

The system 1 shown diagrammatically in the FIGURE is a system for adjusting the descent trajectory of an aircraft (not shown), in particular of a transport aircraft. Although not exclusively, such a descent trajectory is followed, more particularly, during a descent for the purpose of a landing on an airport runway (not shown).

This system 1 comprises an adjustment unit 2 which is installed in the aircraft and which is configured to adjust the descent trajectory and associated prediction calculations. The adjustment unit 2 carries out this adjustment, in the usual manner, as a function of an adjustment parameter. This adjustment unit 2 carries out the adjustment by the intermediary of at least one usual performance function which uses information coming from at least one performance database 3. This performance database 3, also installed in the aircraft, is connected by the intermediary of a link 4 to the adjustment unit 2. The adjustment parameter represents, in the usual manner, a deviation of values of a control parameter of at least one engine of the aircraft.

The control parameter of the engines can correspond to any usual parameter of the engines making it possible to adjust and control these engines. Preferably, the control parameter corresponds to the speed N1 of the low pressure body of the engines of the aircraft.

In the embodiment shown, the adjustment unit 2 and the performance database 3 form part of a flight management system 5 of the FMS (Flight management System) type, which is installed in the aircraft.

In the usual manner, the flight management system 5 also comprises a usual information processing unit 6, which notably has the function of defining a trajectory, notably on the basis of a flight plan comprising a list of waypoints.

The flight management system 5 (and notably its adjustment unit 2) comprises performance calculation means, in particular integration means, which carry out all of the performance calculations, that is to say flight mechanics calculations illustrating the behavior of the aircraft and using the performance database 3. These performance calculation means contain all of the performance calculation functions likely to be used for the calculation of predictions on the flight plan.

The performance database 3 is, preferably, an entity of the static memory type. This performance database 3 stores a large number of tables of usual performance data, that is to say tables of data representing parameters of the aircraft (aerodynamic, engines, . . . ) which are used for usual flight mechanics calculations, called performance calculations.

According to the invention, the system 1 furthermore comprises a data generation unit 7, which comprises:

a set 8 of usual measuring elements, which are installed in the aircraft and which are configured to determine, on the aircraft, during at least one flight of the aircraft, values of flight parameters (speed, altitude, . . . ) of the aircraft, called flight data; and a recording unit 9 installed in the aircraft and configured to record the flight data, determined by the set 8 and received through a link 10.

The flight management system 5 and the data generation unit 7 are installed in the aircraft, as illustrated by the reference 11 in the FIGURE.

The system 1 comprises moreover an adjustment parameter determining device 12, which comprises a central processing unit 13. According to the invention, the central processing unit 13 comprises:

an information processing unit 15 which is configured to process flight data recorded in the unit 7 and received by a data receiving unit 16 of the device 12, as illustrated by a link 17. In order to do this, the flight data can be recorded on a usual storage element which is then connected to the device 12 so that the data receiving unit 16 receives the recorded data. The information processing unit 15 is configured to extract from the flight data (received from the unit 16 via a link 18) data relating to stabilized conditions with the engines of the aircraft idling, representing measurement points;

an information processing unit 20 which is connected by the intermediary of a link 21 to the unit 15 and which is formed so as to determine, for each of the measurement points (that is to say for stabilized conditions with the engines of the aircraft idling), an effective (or real) value of a calculation parameter and associated flight conditions (atmosphere, engine speed, speed, . . . );

an information processing unit 22 which is formed in such a way as to calculate, for each of the measurement points, a theoretical value of the calculation parameter, with the help of an auxiliary performance database 23, to which it is connected by the intermediary of a link 24, for conditions identical to the flight conditions. This auxiliary performance database 23 is identical to the performance database 3 installed in the aircraft; and an information processing unit 25 which is connected by the intermediary of links 26 and 27 to the units 20 and 22 respectively and which is formed in such a way as to automatically calculate, for each of the measurement points, the differences between the effective values and the theoretical values of the calculation parameter, and to calculate the average of these differences in order to obtain a calculation parameter difference. The unit 25 then determines the adjustment parameter from this calculation parameter difference.

This adjustment parameter is transmitted to the adjustment unit 2 which is installed in the aircraft, as illustrated by a link 28. In particular, the value of the adjustment parameter can be entered in the flight management system 5 by a pilot of the aircraft by means of a usual input unit. This adjustment parameter is then used by the adjustment unit 2 to adjust in the usual manner the descent trajectory and the associated prediction calculations during a flight of the aircraft.

The information processing units 15, 20, 22 and 24, as well as the auxiliary performance database 23 form part of the adjustment parameter determining device 12, which is preferably located on the ground and which is notably available to maintenance operators.

Thus, from the data coming from at least one flight, the device 12 carries out, on the ground, an automatic sort of the stabilized data with the engines idling. These data are then compared with the calculated values in the same flight conditions (atmosphere, engine speed, speed,) using the performance database 23 which is identical to the performance database 3 installed in the flight management system 5 of the aircraft. With the results coming from this comparison, the device 12 of the system 1 calculates the adjustment parameter which will then be used, during a subsequent flight, in the adjustment of the descent profiles and of the associated prediction calculations in the flight management system 5.

Thus, thanks to the invention, the adjustment is carried out with the help of an adjustment parameter which is adapted to the real conditions existing on the aircraft (via the recording of flight data), which makes it possible to obtain an accurate adjustment parameter and therefore also an accurate adjustment of the descent trajectory and of the associated prediction calculations (carried out by the flight management system 5).

The control parameter of the engine thus adjusted therefore allows the flight management system 5 to carry out all of its calculations with the appropriate correction. Thus, the theoretical thrust for the descent and approach phases is calculated on the basis of the adjusted control parameter, as are the slope of the trajectory and therefore the start of descent position. Consequently, the descent profile and the associated predictions are corrected with the help of the adjustment of the control parameter.

In a first preferred embodiment, the calculation parameter simply and directly represents the control parameter TSP (Thrust Setting Parameter) of an engine of the aircraft. This control parameter can, for example, correspond to the speed N1 of the primary stage of the engine or to a pressure ratio EPR (Engine Pressure Ratio) of the engine. In this first embodiment, the unit 25 of the device 12 calculates a difference $\Delta$TSP of the control parameter TSP when the engines are idling. The adjustment parameter corresponds to this control parameter difference $\Delta$TSP.

In this first embodiment, the device 12 therefore sorts the recording data coming from a flight in order to determine the measurement points (stabilized conditions, engines idling) and retains, for each measurement point, the flight conditions as well as the value of the control parameter. On each of these measurement points, the device 12 calculates, in the same flight conditions, the theoretical parameter TSP resulting from the performance model. The comparison between the measured flight data and those calculated in the same conditions makes it possible to determine the value of the correction parameter.

This first embodiment notably has the following advantages:

simplicity of use;

speed of calculation; and accuracy of engine data.

Moreover, in a second embodiment, the calculation parameter represents the thrust of at least one engine of the aircraft. In this second embodiment, the unit 25 of the device 12 calculates a thrust difference and converts this thrust difference into a control parameter difference. The adjustment parameter then corresponds to this control parameter difference.

In this second embodiment, the device 12 therefore sorts the recording data resulting from a flight in order to determine the measurement points (stabilized conditions, engines idling) and retains the flight conditions for each measurement point. Using these measurements and flight dynamics equations, the device 12 recalculates, for each measurement point, a balancing thrust. At the same time, for each of these measurement points, the device 12 calculates, on the basis of the measured control parameter, a thrust on the basis of the performance model. The comparison between these two thrust data makes it possible to obtain the corrective adjustment parameter.

This second embodiment simultaneously takes into account the aerodynamic degradations and the degradations of the engines for setting the value of the adjustment parameter.

Moreover, in a third embodiment, the control parameter represents the position of a start of descent point. In this third embodiment, the unit 25 of the device 12 carries out the following operations:
  it determines a start of descent point position difference;
  it determines a theoretical descent profile from this start of descent point position difference; and
  it determines a control parameter difference on the basis of this theoretical descent profile, the adjustment parameter corresponding to this control parameter difference.

In this third embodiment, the device 12 takes as a reference the point of descent of the aircraft during the flight and it recalculates a theoretical start of descent by calculating a theoretical trajectory with the same conditions as those encountered during the flight.

It will be noted that accuracy of the position of the start of descent is essential in order to facilitate the guidance and to avoid thrust increases in level flight or deployments of air brakes.

Moreover, in a particular embodiment, the flight data are acquired for a plurality of flights, with the same aircraft or with different aircraft. The central processing unit 13 of the device 12 then implements the aforesaid operations in order to calculate a plurality of adjustment parameters, that is to say one adjustment parameter per flight. In this particular embodiment, the device 12 comprises a calculation element 29 (integrated for example in the unit 25) for calculating the average of the plurality of adjustment parameters in order to obtain an optimized adjustment parameter. The adjustment parameter thus optimized is then used by the adjustment unit 2 in order to adjust the descent trajectory.

In this particular embodiment, a statistical analysis is carried out over a given number of flights and of aircraft, in order to determine an average value of the adjustment parameter for a given fleet of aircraft.

The advantage obtained is a saving of calculation time (a single calculation for a whole fleet), but this saving is made at the expense of the calculation accuracy, the adjustment parameter thus calculated not taking into account a possible dispersion between different aircraft.

Moreover, a regularly calculated adjustment makes it possible to follow the status of each aircraft of a fleet independently and therefore to identify degradation deviations making it possible to initiate or to bring forward appropriate maintenance operations.

The present invention therefore provides an automatic identification of the adjustment parameter which is used for the adjustment of the calculations, and it does so as a function of the real performance of the aircraft. Consequently, thanks to the invention, the maintenance services of airline companies have a reliable, accurate and repeatable means for determining the adjustment parameter accurately.

The following is therefore obtained:
  an adjustment of the calculation of the flight plan in descent and of the associated predictions;
  better accuracy of the indication to the pilot of the moment of start of descent of the aircraft; and
  guidance of the aircraft on a descent plan representative of the real capability of the aircraft.

The system 1 carries out an automation (by determining the adjustment parameter automatically), and it also makes it possible to obtain high accuracy, the adjustment parameter being determined with a level of accuracy adapted to the optimum determination of the start of descent point.

Thus, thanks to the invention, with a descent plan that is better optimized and therefore a guidance of the aircraft on this new plan, the aircraft will carry out a longer part of its descent in idling mode. Reduced fuel consumption and a reduction in the emission of particles are thus notably obtained.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for adjusting a descent trajectory of an aircraft, comprising:
  adjusting the descent trajectory and associated prediction calculations as a function of an adjustment parameter via at least one performance function using at least one performance database installed in the aircraft, said adjustment parameter representing a deviation of values of a control parameter of at least one engine of the aircraft, and
  a series of steps, prior to the adjustment step, comprising, automatically:
  determining and recording on at least one aircraft, during at least one flight of the aircraft, values of flight parameters of said aircraft called flight data;
  extracting from said recorded flight data, data relating to stabilized conditions with the engines of the aircraft idling, representing measurement points,
  determining, for each of said measurement points, an effective value of a calculation parameter and associated flight conditions;
  calculating, for said measurement points, theoretical values of the calculation parameter using an auxiliary performance database which is identical to the performance database installed in the aircraft, for conditions identical to said flight conditions; and
  calculating, for said measurement points, differences between the effective values and theoretical values of said calculation parameter, and deriving therefrom a calculation parameter difference and of determining, from this calculation parameter difference, said adjustment parameter which is then used for adjusting the descent trajectory and the associated prediction calculations,
  wherein the series of steps, prior to the adjustment step, is implemented for a plurality of flights in order to calculate a plurality of adjustment parameters, with a calculation of one adjustment parameter for each flight, and further comprising an additional step of calculating an average of said plurality of adjustment parameters in order to obtain an optimized adjustment parameter, said optimized adjustment parameter being used for adjusting the descent trajectory during the adjustment step.

2. The method as claimed in claim 1, wherein the series of steps, prior to the adjustment step is implemented for flights carried out by different aircraft.

3. The method as claimed in claim 1, wherein said calculation parameter corresponds to said control parameter of the engine of the aircraft, and wherein the step of calculating differences comprises calculating a control parameter difference, said adjustment parameter corresponding to this control parameter difference.

4. The method as claimed in claim 1, wherein said calculation parameter represents a thrust of at least one engine of the aircraft, and wherein the step of calculating differences comprises calculating a thrust difference and in converting this thrust difference into a control parameter difference, said adjustment parameter corresponding to this control parameter difference.

5. The method as claimed in claim 1, wherein said control parameter represents a position of a start of descent point, and wherein the step of calculating differences comprises:
 calculating a start of descent point position difference between an effective value and a theoretical value;
 determining a theoretical descent profile from this start of decent point position difference; and
 determining a control parameter difference from this theoretical descent profile, said adjustment parameter corresponding to this control parameter difference.

6. The method as claimed in claim 1, wherein said control parameter is the speed of a low pressure body of an engine of the aircraft.

7. A system for adjusting a descent trajectory of an aircraft, said system comprising:
 an adjustment unit installed in the aircraft and configured to automatically adjust the descent trajectory and associated prediction calculations as a function of an adjustment parameter via at least one performance function, said performance function using at least one performance database, also installed in the aircraft, said adjustment parameter representing a deviation of values of a control parameter of at least one engine of the aircraft,
 a set of measuring units installed in the aircraft and configured for automatically determining, during at least one flight of the aircraft, values of flight parameters of said aircraft, called flight data;
 at least one recording unit installed in the aircraft and configured to automatically record said flight data;
 a first information processing unit configured to automatically extract from said recorded flight data, data relating to stabilized conditions with the engines of the aircraft idling, representing measurement points;
 a second information processing unit configured to determine, for each of said measurement points, an effective value of a calculation parameter and associated flight conditions;
 a third information processing unit configured to automatically calculate, for said measurement points, a theoretical value of the calculation parameter, with the help of an auxiliary performance database which is identical to the performance database installed in the aircraft, for conditions identical to said flight conditions;
 a fourth information processing unit configured to automatically calculate, for said measurement points, the differences between the effective values and the theoretical values of said calculation parameter, and to derive therefrom a calculation parameter difference, and to determine the adjustment parameter from this calculation parameter difference, said adjustment parameter being transmitted to the adjustment unit and being used by the adjustment unit for adjusting the descent trajectory and the associated prediction calculations;
 wherein the automatically determining values of flight parameters by the set of measurement units, the automatically recording flight data by the at least one recording unit, the automatically extracting data relating to stabilized conditions by the first information processing unit, the determining the effective value of the calculation parameter and associated flight conditions by the second information processing unit, the automatically calculating the theoretical value by the third information processing unit, and the automatically calculating the differences between the effective values and the theoretical values of said calculation parameter and deriving therefrom a calculation parameter by the fourth information processing unit are implemented for a plurality of flights in order to calculate a plurality of adjustment parameters, with a calculation of one adjustment parameter for each flight; and
 wherein the fourth information processing unit is further configured to calculate an average of said plurality of adjustment parameters in order to obtain an optimized adjustment parameter, said optimized adjustment parameter being used for adjusting the descent trajectory by the adjustment unit.

8. The system as claimed in claim 7, further comprising a flight management system installed in the aircraft and comprising said adjustment unit and said performance database.

9. The system as claimed in claim 7, wherein said first, second, third and fourth information processing units, as well as said auxiliary performance database, form part of an adjustment parameter determining device, said adjustment parameter determining device being located on ground.

* * * * *